(12) United States Patent
Ullidtz

(10) Patent No.: US 8,596,116 B2
(45) Date of Patent: Dec. 3, 2013

(54) TRIANGULATION OF PAVEMENT DEFLECTIONS USING MORE THAN FOUR SENSORS

(75) Inventor: Per Ullidtz, Copenhagen (DK)

(73) Assignee: Dynatest International A/S, Glostrup (DK)

( * ) Notice: Subject to any disclaimer, the term of this patent is extended or adjusted under 35 U.S.C. 154(b) by 228 days.

(21) Appl. No.: 12/906,896

(22) Filed: Oct. 18, 2010

(65) Prior Publication Data
US 2011/0259114 A1 Oct. 27, 2011

Related U.S. Application Data

(60) Provisional application No. 61/252,488, filed on Oct. 16, 2009.

(51) Int. Cl.
*E01C 23/00* (2006.01)

(52) U.S. Cl.
USPC ................................ 73/146; 73/104; 73/105

(58) Field of Classification Search
USPC ........................................... 73/104, 105, 146
See application file for complete search history.

(56) References Cited

U.S. PATENT DOCUMENTS

| | | | | |
|---|---|---|---|---|
| 4,048,849 A | * | 9/1977 | Gocho et al. ................... | 73/105 |
| 4,288,855 A | * | 9/1981 | Panetti ......................... | 702/168 |
| 4,571,695 A | * | 2/1986 | Elton et al. ................... | 702/167 |
| 4,573,131 A | * | 2/1986 | Corbin ......................... | 702/168 |
| 4,708,516 A | | 11/1987 | Miller ........................... | 404/31 |
| 4,788,859 A | * | 12/1988 | Khattak ........................ | 73/146 |
| 5,046,366 A | * | 9/1991 | Basson et al. ................. | 73/784 |
| 5,280,719 A | * | 1/1994 | Noss ............................. | 73/146 |
| 5,753,808 A | * | 5/1998 | Johnson ....................... | 73/146 |
| 5,952,561 A | * | 9/1999 | Jaselskis et al. .............. | 73/78 |
| 6,119,353 A | * | 9/2000 | Grønskov ..................... | 33/1 Q |
| 6,925,859 B2 | * | 8/2005 | Riat .............................. | 73/104 |
| 7,003,894 B2 | * | 2/2006 | Schajer et al. ................ | 33/552 |
| 2005/0204572 A1 | | 9/2005 | Schajer | |
| 2010/0132442 A1 | * | 6/2010 | Lodge et al. .................. | 73/105 |
| 2010/0316445 A1 | | 12/2010 | Kasahara et al. ............. | 404/77 |
| 2012/0010828 A1 | * | 1/2012 | Ullidtz ......................... | 702/42 |

FOREIGN PATENT DOCUMENTS

| | | |
|---|---|---|
| JP | 2002371503 A | 12/2002 |
| KR | 2007-0013705 A | 7/2007 |

OTHER PUBLICATIONS

Bambang S. Subagio, Arif Rachman, Hernadi T. Cahyanto, and Siti Mardiyah. "Multi-Layer PAvement Structural Analysis Using Method of Equivalent Thickness Case Study: Jakarta-Cikampek Toll Road". Journal of the Eastern Asia Society for Transportation Studies, vol. 6, pp. 55-65, (2005).*

International Search Report and Written Opinion in counterpart application No. PCT/US2010/002791 mailed Jul. 1, 2011.

(Continued)

*Primary Examiner* — Leonard Chang
*Assistant Examiner* — Natalie Huls
(74) *Attorney, Agent, or Firm* — Koppel, Patrick, Heybl & Philpott

(57) ABSTRACT

Systems and methods are disclosed that provide improved non-destructive testing of pavements and in particular non-destructive testing of pavements using rolling wheel deflectometer systems having more than four sensors. The additional sensors more accurately detect pavement deflections under load by compensating for the influence the load deflection basin can have on sensors beyond those at the wheel load. The sensors should be spaced with equal distances from the rolling weight and can have a distance between adjacent sensors that is greater than the equivalent thickness of the pavement being measured.

17 Claims, 3 Drawing Sheets

(56) References Cited

OTHER PUBLICATIONS

International Search Report and Written Opinion for PCT Application No. PCT/US2010/002792 mailed Jul. 1, 2011.

Briggs, et al., "A Comparison of the Rolling Weight Deflectometer with the Falling Weight Deflectometer", Nondestrictive Testing of Pavements and Backcalculation of Moduli: Third Volume, ASTM STP 1375, S.D. Tayabji and E.O. Lukanen, Eds., American Society for Testing and Materials, West Conshohocken, PA, 1999.

"Noncontact Nondestructive Determination of Pavement Deflection Under Moving Loads", Air Force Civil Engineering Center, Tyndall AFB FL, Aug. 1977, U.S. Department of Commerce, National Technical Information Service.

Definition of "first", thefreedictionary.com, http://thefreedictionary.com/p/first.

* cited by examiner

TRIANGULATION OF PAVEMENT DEFLECTIONS USING MORE THAN FOUR SENSORS

This application claims the benefit of U.S. Provisional Patent Application No. 61/252,488 to Ullidtz et al., filed on Oct. 16, 2009.

BACKGROUND OF THE INVENTION

1. Field of the Invention

This invention relates to nondestructive testing of pavements and in particular to testing of pavements using rolling wheel deflectometers along with triangulation processes.

2. Description of the Related Art

Load bearing capability for airport runways or highway pavements may deteriorate, over time, due to a number of factors, including changes in the elastic moduli of subpavement layers of earth. In order to determine pavement condition for airport runways or highways, the load bearing capability of the pavement can be periodically tested. In order to measure the load bearing capability of the pavement, it is desirable to utilize technologies that are nondestructive so that the integrity of the pavement layer is maintained. Further, the measurements should desirably be made rapidly, through an automated system, to minimize time and reduce costs.

Different methods have been developed for the non-destructive testing of pavements, with one utilizing a falling weight dropped on the pavement from a stationary platform. Sensors then measure the deflection of the pavement at intervals out from the falling weight. Systems utilizing this method are commonly referred to as falling weight deflectometers (FWD or FWDs).

Other systems utilize a fast moving, heavy wheel load that rolls along the pavement, with sensors being arranged and intervals out from the wheel to measure deflection. Systems utilizing this approach are commonly referred to as rolling weight deflectometers (RWD or RWDs). A device of this type is disclosed in U.S. Pat. No. 4,571,695. In essence, a load is placed on a wheel that rolls across the pavement and the depth of a deflection basin created by the loaded wheel is measured using precision laser sensors mounted on a horizontal member that tracks with the wheel. Such deflection measurements provide insight into the load bearing capability of the pavement. However, pavement deflections are usually very small, typically 0.010 to 0.040 inch for a 20,000 pound applied load. Therefore, not only are extremely sensitive sensors required to measure the deflection, but the sensors should have a stable reference plane.

The deflection of the pavement surface under a fast moving, heavy wheel load may be measured through triangulation. A simple algorithm for a system using four sensors was developed by Professor Milton Harr of Purdue University (See Harr, M., and N. Ng-A-Qui, 1977, "Noncontact, Nondestructive Determination of Pavement Deflection Under Moving Loads," FAA-RD-77-127, U.S. Department of Transportation, Washington D.C).

The Harr algorithm was published 30 years ago and several systems for road testing are based on this approach. The method is illustrated in FIG. 1. (See Briggs, R. C., Johnson, R. F., Stubstad, R. N., and Pierce, L., "A Comparison of the Rolling Weight Deflectometer with the Falling Weight Deflectometer," Nondestructive Testing of Pavements and Backcalculation of Moduli: Third Volume, ASTM STP 1375, S. D. Tayabji and E. O. Lukanen, Eds., American Society for Testing and Materials, West Conshohocken, PA, 1999.)

Using the approach shown in FIG. 1, the sensors are placed at equal distances apart and two sets of measurements are carried out, at points with spacing equal to the distance between the sensors. From the first set of measurement the distance, h, from a reference line, through points $P_1$ and $P_2$, to the pavement surface at point $P_3$ is calculated from:

$$h = A - 2 \times B + C$$

where A, B and C are the measured distances from the beam to the pavement surface at points $P_1$, $P_2$ and $P_3$, respectively, during the first set of measurements.

From the second set of measurements the same distance may be calculated from:

$$h' = B' - 2 \times C' + D'$$

where B', C' and D' are the measured distances from the beam to the pavement surface at points $P_1$, $P_2$ and $P_3$, respectively, during the second set of measurements.

If there is no deflection under the load of the wheel, h' and h will be identical, so the difference between h' and h is the deflection of the pavement caused by the wheel load. The combination the equations above is commonly known as "Harr's algorithm". Harr's algorithm is typically correct if it is assumed that only the pavement at the position of one sensor is influenced by the deflection from the wheel, whereas the remaining sensors are assumed to be outside of the deflection caused by the wheel load, i.e. the deflection basin. That is, the wheel load is assumed not to spread beyond the immediate area of the wheel load to cause any changes at locations other than the one sensor at the wheel load. This assumption is not always correct, and may only be correct for pavements with very shallow depth to bedrock.

SUMMARY OF THE INVENTION

The present invention is directed to a system and method that provides for greater accuracy in the measurement of pavement deflections. In particular, the present invention is arranged to provide for higher accuracy pavement deflection measurements even under those applications where the deflection basin may influence other sensors beyond those that are at the wheel load. Embodiments according to the present invention can comprise at least one additional, or fifth, sensor that is added to the sensor array. By implementing this arrangement it can be possible to correct for the influence of the deflection basin on the outer sensors. The invention is the concept of using more than four sensors to correct the limitations of the Harr's algorithm. With this new invention, the accuracy and measurement range can be significantly extended.

One embodiment of a rolling weight pavement deflection measurement system according to the present invention comprises a rolling weight and a sensor holding frame arranged to move in unison with the rolling weight. More than four sensors are mounted to the beam with equal distance between adjacent ones of the sensors. One of the sensors is mounted approximately at the rolling weight, and each of the sensors measure the distance between it and the pavement.

Another embodiment of a pavement deflection measurement system according to the present invention comprises a weight for causing deflection in said pavement, and more than four sensors arranged with equal distance between adjacent ones of the sensors. One of the sensors arranged approximately at the weight, and each of the sensors measures the distance between it and the pavement. The distance between adjacent ones of the sensors is larger than the equivalent thickness of the pavement layers in the pavement being measured.

One embodiment of a method for measuring the deflection of pavement comprises providing a rolling weight on the pavement and measuring the distance between said rolling weight and the pavement. The distance to the pavement at four equal distance measuring points ahead of said rolling weight is also measured. The weight is then rolled a first time at a distance equal to the distance between said measuring points and the distance to said pavement is measured a second time at the rolling weight and the measuring points. The weight is rolled a second time at a distance equal to the distance between the measuring points and the distance between the pavement is measured a third time at the rolling weight and the measuring points. The pavement deflection under the rolling weight is then calculated using distance measurements.

These and other aspects and advantages of the invention will become apparent from the following detailed description and the accompanying drawings which illustrate by way of example the features of the invention.

DETAILED DESCRIPTION OF THE INVENTION

The present invention is directed to systems and methods that provide improved non-destructive testing of pavements and in particular non-destructive testing of pavements using RWDs having more than four sensors. The additional sensors more accurately detect pavement deflections under load by compensating for the influence the load deflection basin can have on sensors beyond those at the wheel load for different types of pavements.

The present invention is described herein with reference to certain embodiments, but it is understood that the invention can be embodied in many different forms and should not be construed as limited to the embodiments set forth herein. In particular many different sensor and wheel load arrangements can be provided beyond those described above, and many different sensors and loads can be used. The invention is described below with reference to using five sensors to provide for more accurate deflection measurements, but it is understood that more than five sensors can be used in different embodiments according to the present invention, such as six, seven, eight, nine or more.

It is also understood that when an element such as a layer, region or substrate is referred to as being "on" another element, it can be directly on the other element or intervening elements may also be present. Furthermore, relative terms such as "above", and "below", and similar terms, may be used herein to describe a relationship of one layer or another region. It is understood that these terms are intended to encompass different orientations of the device in addition to the orientation depicted in the figures.

Although the terms first, second, etc. may be used herein to describe various elements and/or components, these elements and/or should not be limited by these terms. These terms are only used to distinguish one element or component from another element or component. Thus, a first element or component could be termed a second element or component without departing from the teachings of the present invention.

Embodiments of the invention are described herein with reference to schematic view illustrations. As such, the actual dimensions of the elements of the present invention may vary depending on the particular arrangement of the invention as well as the manufacturing techniques employed. Embodiments of the invention should not be construed as limited to the particular shapes or sizes of the elements illustrated herein but are to include deviations. Thus, the elements illustrated in the figures are schematic in nature and their shapes are not intended to illustrate the precise shape of an element and are not intended to limit the scope of the invention.

Figure 1:
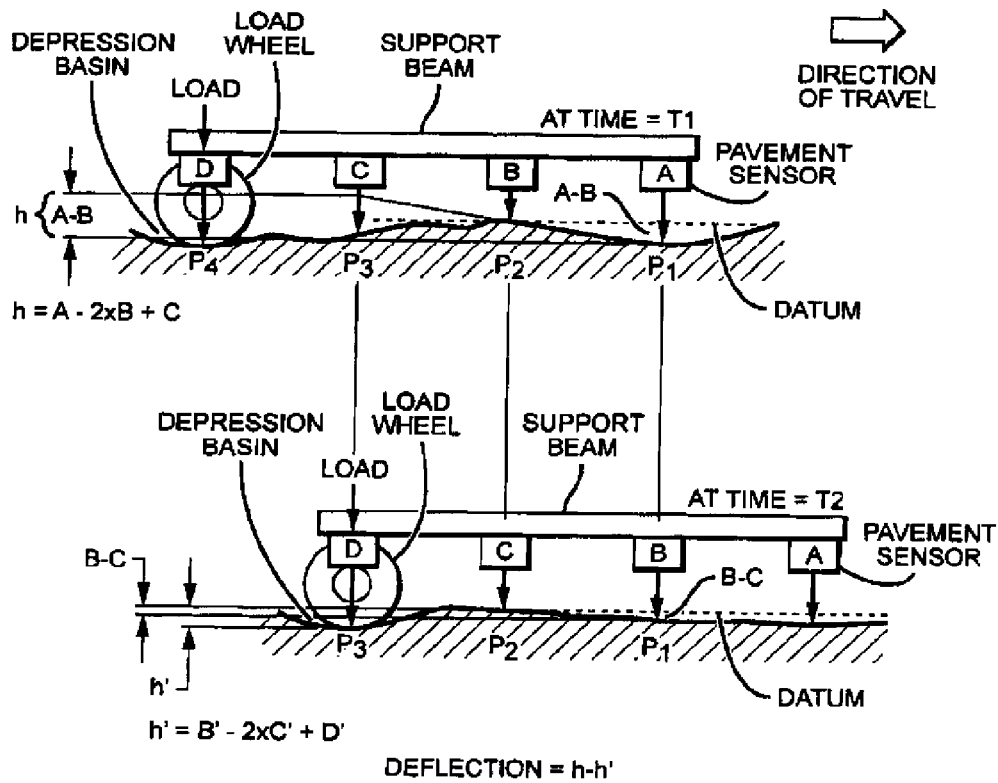
FIG. 1 is a schematic showing a prior art RWD system using four sensors.

Referring again to FIG. 1, and as mentioned above, with four sensor RWDs using Harr's algorithm the results may be correct in applications where it is assumed that only the pavement at the position of sensor D is influenced by the deflection from the wheel load, whereas the remaining sensors are assumed to be outside of the deflection basin. This assumption is not correct, except for pavements with very shallow depth to bedrock.

Figure 2:
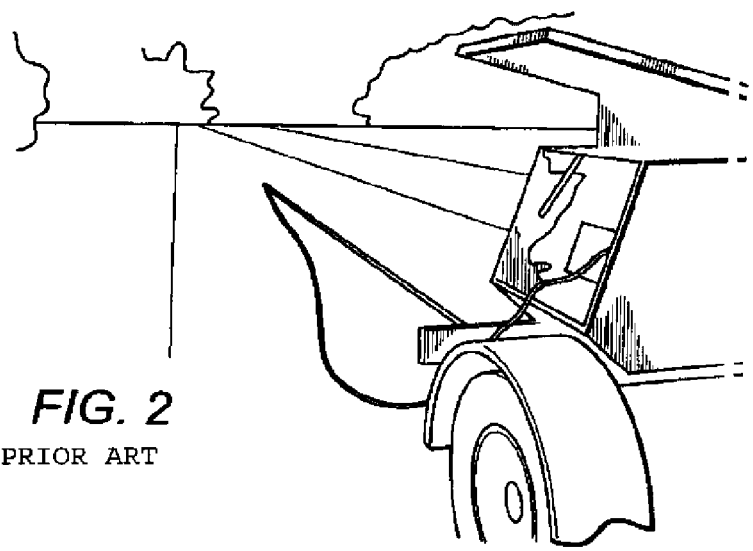
FIG. 2 is a photograph of a FWD system utilized to measure the range of the deflection basin.
Figure 3:
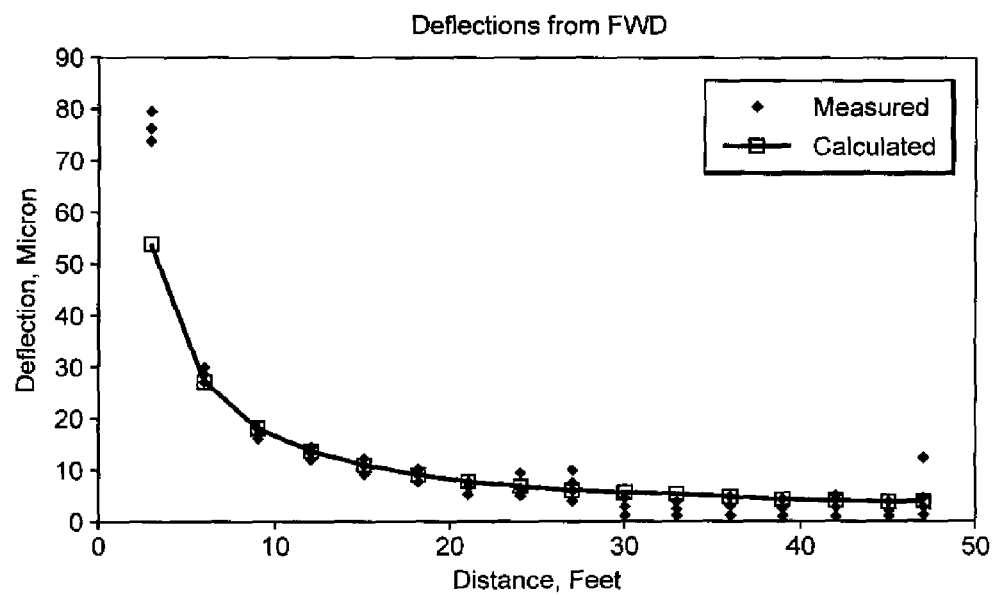
FIG. 3 is a graph showing FWD measurements compared to theoretical deflections.

To confirm this, deflections were measured with a Falling Weight Deflectometer (FWD) as shown in FIG. 2 out to a distance of 47 feet (14.3 m). FWD typically produce deflections similar to the deflections under a rolling wheel load. The measured deflections, normalized to a load of 12000 lbf, are shown in FIG. 3, as well as theoretical deflections calculated for a semi-infinite half-space with a coefficient of elasticity (called modulus in the following) of 300 MPa, using Boussinesq's equation for a point load. The variation with distance is similar for the measured and the calculated deflections. This shows that the theoretical deflections, calculated using the theory of elasticity, correspond to the actual deflections.

To establish the accuracy (or limitations to the accuracy) of Harr's algorithm, the deflections were calculated using a commercially available layered elastic computer program known as WesLea, for 27 different pavement structures. A 50 kN single wheel load was applied. The contact pressure was assumed to be evenly distributed over a circular area with radius 150 mm (tire pressure 0.707 MPa). Deflections were calculated for a sensor spacing of 9 feet (2743 mm, total beam length of 27 feet, approximately 8.2 m) at a line offset by 200 mm from the center of the wheel. Poisson's ratio was assumed to be 0.35 for all materials.

The calculations were done for three different thicknesses of layer one, $h_1$: 100, 200 and 400 mm, with moduli of layer one, $E_1$, of 1000 (asphalt during summer), 8000 (asphalt during winter) and 35000 MPa (Portland Cement Concrete). Layer number two was kept constant at a thickness of 200 mm and a modulus of 300 MPa, and for the subgrade three moduli, $E_{sg}$: 30 (soft), 60 and 120 (stiff) MPa were used. The resulting structures were as follows:

| No | h1, mm | E1, MPa | Esg, MPa |
|---|---|---|---|
| 1 | 100 | 1000 | 30 |
| 2 | 100 | 1000 | 60 |
| 3 | 100 | 1000 | 120 |
| 4 | 100 | 8000 | 30 |
| 5 | 100 | 8000 | 60 |

-continued

| No | h1, mm | E1, MPa | Esg, MPa |
|---|---|---|---|
| 6 | 100 | 8000 | 120 |
| 7 | 100 | 35000 | 30 |
| 8 | 100 | 35000 | 60 |
| 9 | 100 | 35000 | 120 |
| 10 | 200 | 1000 | 30 |
| 11 | 200 | 1000 | 60 |
| 12 | 200 | 1000 | 120 |
| 13 | 200 | 8000 | 30 |
| 14 | 200 | 8000 | 60 |
| 15 | 200 | 8000 | 120 |
| 16 | 200 | 35000 | 30 |
| 17 | 200 | 35000 | 60 |
| 18 | 200 | 35000 | 120 |
| 19 | 400 | 1000 | 30 |
| 20 | 400 | 1000 | 60 |
| 21 | 400 | 1000 | 120 |
| 22 | 400 | 8000 | 30 |
| 23 | 400 | 8000 | 60 |
| 24 | 400 | 8000 | 120 |
| 25 | 400 | 35000 | 30 |
| 26 | 400 | 35000 | 60 |
| 27 | 400 | 35000 | 120 |

Figure 4:
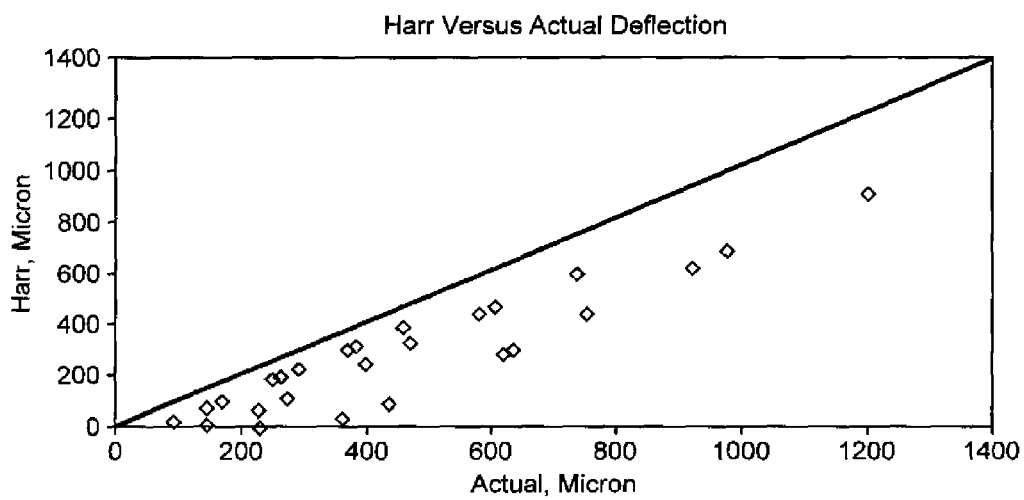
FIG. 4 is a graph showing the calculated maximum deflection verses actual deflection for a four sensor system.

FIG. 4 shows the calculated deflection closest to the wheel load (200 nm from the center of the wheel) compared to the deflection obtained using Harr's algorithm. FIG. 4 shows that up to a deflection of about 400 μm (16 mil) the deflection from Harr's algorithm may be close to zero (or even negative). At higher deflection levels the deflections from Harr's algorithm have the same trend as the actual deflections, but may be off by more than 300 μm, or 12 times the accuracy normally aimed for with Harr's algorithm. With a measured deflection of 350 μm the actual deflection could be from 400 μm to 700 μm.

According to the present invention, if at least one additional, fifth, sensor is added to the sensor array the influence of the deflection basin on the outer sensors can be corrected or compensated for. In one embodiment, this correction is particularly effective provided that the distance between the sensors is larger than the equivalent thickness of the pavement layers with respect to the subgrade. The equivalent thickness is calculated from the following:

$$h_e = \sum_{i=1}^{m-1} h_i \times \sqrt[3]{E_i/E_m}$$

where
$h_e$ is the equivalent thickness,
$h_i$ is the thickness of layer i,
$E_i$ is the modulus of layer i, and
$E_m$ is the modulus of the subgrade (layer m).

For the structures of Table 1 the following equivalent thicknesses can be calculated (thicknesses in mm and moduli in MPa):

TABLE 1

Structures with equivalent thickness, $h_e$, in mm

| | h1 | h2 | E1 | E2 | E3 | $h_e$ |
|---|---|---|---|---|---|---|
| 1 | 100 | 200 | 1000 | 300 | 30 | 753 |
| 2 | 100 | 200 | 1000 | 300 | 60 | 597 |
| 3 | 100 | 200 | 1000 | 300 | 120 | 474 |
| 4 | 100 | 200 | 8000 | 300 | 30 | 1075 |
| 5 | 100 | 200 | 8000 | 300 | 60 | 853 |
| 6 | 100 | 200 | 8000 | 300 | 120 | 677 |
| 7 | 100 | 200 | 35000 | 300 | 30 | 1484 |
| 8 | 100 | 200 | 35000 | 300 | 60 | 1178 |
| 9 | 100 | 200 | 35000 | 300 | 120 | 935 |
| 10 | 200 | 200 | 1000 | 300 | 30 | 1075 |
| 11 | 200 | 200 | 1000 | 300 | 60 | 853 |
| 12 | 200 | 200 | 1000 | 300 | 120 | 677 |
| 13 | 200 | 200 | 8000 | 300 | 30 | 1718 |
| 14 | 200 | 200 | 8000 | 300 | 60 | 1364 |
| 15 | 200 | 200 | 8000 | 300 | 120 | 1082 |
| 16 | 200 | 200 | 35000 | 300 | 30 | 2536 |
| 17 | 200 | 200 | 35000 | 300 | 60 | 2013 |
| 18 | 200 | 200 | 35000 | 300 | 120 | 1598 |
| 19 | 400 | 200 | 1000 | 300 | 30 | 1718 |
| 20 | 400 | 200 | 1000 | 300 | 60 | 1364 |
| 21 | 400 | 200 | 1000 | 300 | 120 | 1082 |
| 22 | 400 | 200 | 8000 | 300 | 30 | 3006 |
| 23 | 400 | 200 | 8000 | 300 | 60 | 2385 |
| 24 | 400 | 200 | 8000 | 300 | 120 | 1893 |
| 25 | 400 | 200 | 35000 | 300 | 30 | 4642 |
| 26 | 400 | 200 | 35000 | 300 | 60 | 3684 |
| 27 | 400 | 200 | 35000 | 300 | 120 | 2924 |

Figure 5:
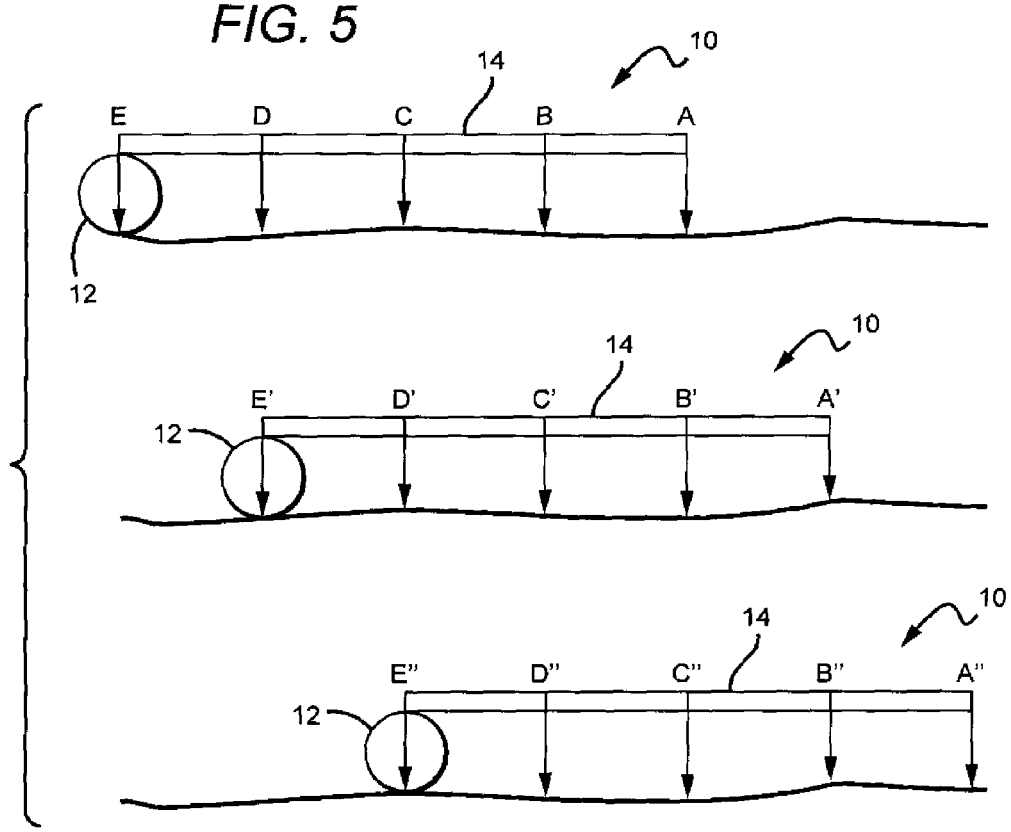
FIG. 5 is a schematic of one embodiment of a RWD according to the present invention utilizing five sensors.

FIG. 5 shows one embodiment of a RWD system 10 according to the present invention with a rolling weight 12 and a beam 14 attached to the rolling weight. The system 10 further comprises five sensors designated with reference number E, D, C, B and A. The sensors are attached to the beam 14 with equal distance between adjacent sensors, with sensor E attached to the beam at the rolling weight 12 and sensor A being furthest from the rolling weight. As mentioned above, it is understood that other embodiments can be provided with more than five sensors. It is also understood that the RWD system can comprise many known components not shown, such as a computer that can provide control over the system 10 to make the measurements described herein, and to also conduct the calculations discussed herein. The sensors can comprise many different commercially available sensors that can be actuated in many different ways to conduct the calculations discussed herein.

For structures listed above in Table 1 under numbers 1-15, 18-21, and 24, comprise and equivalent thickness ($h_e$) is less than 2000 mm. In embodiments of RWD systems according to the present invention pavement deflections for these can be measured with the five sensors being 2 meters (m) apart or at distances of 0, 2, 4, 6 and 8 m on the beam 12. For the RWD 10, three sets of calculations are carried out with distances equal to the sensor distance, or at 2 meter intervals.

For structures listed in Table 1 under numbers 16-17, 23, and 27 the equivalent thickness ($h_e$) is between 2000 and 3000 mm, and for these the distance between the sensors in an RWD system according to the present invention should be 3 m. For the remaining Table 1 structures under numbers 22, 25 and 26 the equivalent thickness ($h_e$) is greater than 3000 mm and in an RWD system according to the present invention the distance between sensors should be even larger, although for the example shown here the last two structures were also calculated for a sensor distance of 3 m.

First a value, $h_D$, is calculated from the first two sets of measurements:

$$h_D = B' - 2 \times C' + D' - A + 2 \times B - C$$

Secondly the deflection under the wheel, d, is calculated from the second and third sets of measurements:

$$d = (C'' - k \times h_D/2) - 2 \times (D'' - k \times h_D) + E'' - (B' - k \times h_D/3) + 2 \times (C' - k \times h_D/2) - (D' - k \times h_D)$$

The value of k is determined from a least squares method, and was found to be about 3.6 for a distance of 2 m and 3.86 for 3 m, using the same single wheel load as before.

Figure 6:
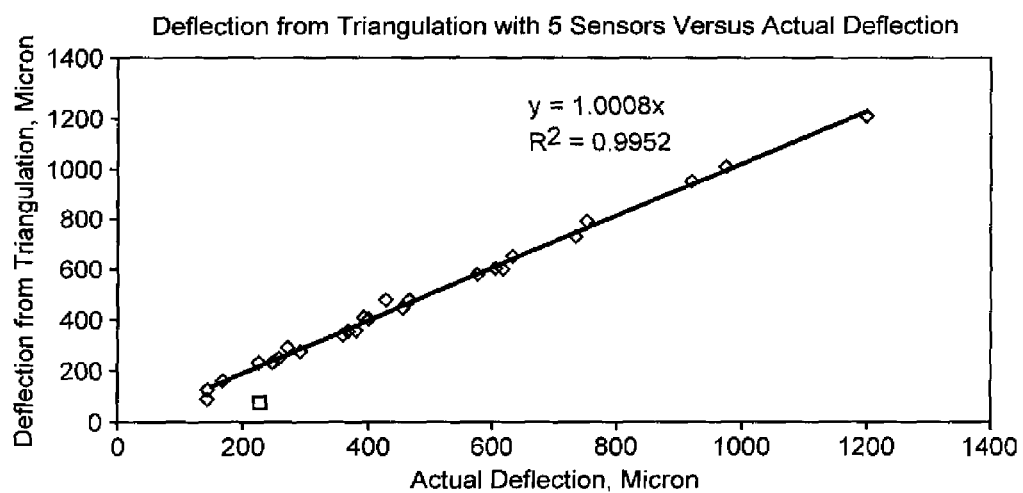
FIG. 6 is a graph showing the calculated maximum deflection verses actual deflection for a five sensor system according to the present invention.

FIG. 6 shows the deflections, calculated from the equations above versus the actual deflections, and shows the improvement in measurement accuracy compared to FIG. 4 discussed above. The standard error of estimate is 19 micron (0.75 mil).

For triangulation systems according to the present invention using a beam mounted on a truck, the influence on the deflections from all of the wheel loads should be taken into consideration, which can require information on the truck geometry and the load on each wheel.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. Therefore, the spirit and scope of the invention should not be limited to the versions described above.

We claim:

1. A rolling weight pavement deflection and load measurement system, comprising:
    a rolling weight configured to roll in a first direction;
    a sensor holding frame arranged to move in unison with said rolling weight; and
    five or more sensors including a first sensor, a last sensor, and three or more middle sensors between said first sensor and said last sensor, each of said sensors mounted to said sensor holding frame;
    wherein said sensors are approximately aligned in said first direction or a second direction parallel to said first direction;
    wherein each of said sensors is configured to measure the distance between it and a pavement; and
    wherein said five or more sensors are configured to provide information that allows for correction of a source of error in a four or more sensor system.

2. The system of claim 1, wherein said frame comprises a beam.

3. The system of claim 1, wherein said first sensor is nearer said rolling weight than any other of said sensors, and wherein the distance between said first sensor and a nearest of said middle sensors is larger than the equivalent thickness of the pavement layers.

4. The system of claim 1, wherein said first sensor is nearer said rolling weight than any other of said sensors, and wherein the distance between said first sensor and a nearest of said middle sensors is larger than the equivalent thickness of the pavement layers with respect to the subgrade.

5. The system of claim 1, wherein said first sensor is nearer said rolling weight than any other of said sensors, and wherein the distance between said first sensor and a nearest of said middle sensors is approximately 2 meters.

6. The system of claim 1, wherein said first sensor is nearer said rolling weight than any other of said sensors, and wherein the distance between said first sensor and a nearest of said middle sensors is approximately 3 meters.

7. The system of claim 1, wherein said first sensor is nearer said rolling weight than any other of said sensors, and wherein the distance between said first sensor and a nearest of said middle sensors is greater than 3 meters.

8. A pavement deflection and load measurement system, comprising:
    a weight for causing deflection in said pavement, said weight configured to move in a first direction; and
    five or more sensors including a first sensor, a last sensor, and three or more middle sensors between said first sensor and said last sensor, said sensors approximately aligned in said first direction or a second direction parallel to said first direction each of said sensors measuring the distance between it and the pavement being measured;
    wherein said first sensor is nearer said weight than any other of said sensors, and wherein the distance between said first sensor and a nearest of said middle sensors is equal to or larger than the equivalent thickness of the pavement layers in the pavement being measured; and
    wherein said five or more sensors are configured to provide information that allows for correction of a source of error in a four or more sensor system.

9. The system of claim 8, wherein said weight comprises a rolling weight.

10. The system of claim 9, wherein said sensors are arranged to move in unison with said rolling weight.

11. The system of claim 8, wherein said sensors are mounted linearly.

12. The system of claim 8, wherein said sensors are mounted on a beam.

13. A method for measuring the deflection of pavement, comprising:
    providing a rolling weight on a pavement;
    measuring the distance to the pavement at at least a first, second, and third distance ahead of said rolling weight to form a first measurement set;
    rolling said weight a first time;
    measuring the distance to the pavement at said second and third distances and a fourth distance ahead of said rolling weight to form a second measurement set;
    rolling said weight a second time;
    measuring the distance to the pavement at approximately said rolling weight and at said third and fourth distances ahead of said rolling weight to form a third measurement set; and
    performing a calculation of the pavement deflection under said rolling weight using said first, second, and third measurement sets;
    wherein said calculation can correct for a source of error in a prior art calculation.

14. The method of claim 13, wherein the distance between said rolling weight and said fourth distance is equal to or greater than the equivalent thickness of pavement layers in the pavement being measured.

15. The method of claim 14, wherein the equivalent thickness can be calculated using the equation $$h_e = \sum_{i=1}^{m-1} h_i \times \sqrt[3]{E_i/E_m}.$$

16. The method of claim 13, wherein each of said distances to the pavement is measured using a distance sensor.

17. The method of claim 13, wherein each of said distances to the pavement is measured using a distance sensor, and wherein said distance sensors are mounted to a rigid frame arranged to move in unison with said rolling weight.

* * * * *

UNITED STATES PATENT AND TRADEMARK OFFICE
CERTIFICATE OF CORRECTION

PATENT NO. : 8,596,116 B2  Page 1 of 1
APPLICATION NO. : 12/906896
DATED : December 3, 2013
INVENTOR(S) : Ullidtz It is certified that error appears in the above-identified patent and that said Letters Patent is hereby corrected as shown below:

In the Specification

Column 5, Line 25, should read after: load (200 ~~nm~~ mm from the center of the wheel)...

Signed and Sealed this
Eighth Day of July, 2014

Michelle K. Lee
*Deputy Director of the United States Patent and Trademark Office*